Oct. 23, 1923.
W. McCLINTOCK
1,471,500
HOSE RACK
Filed June 9, 1922
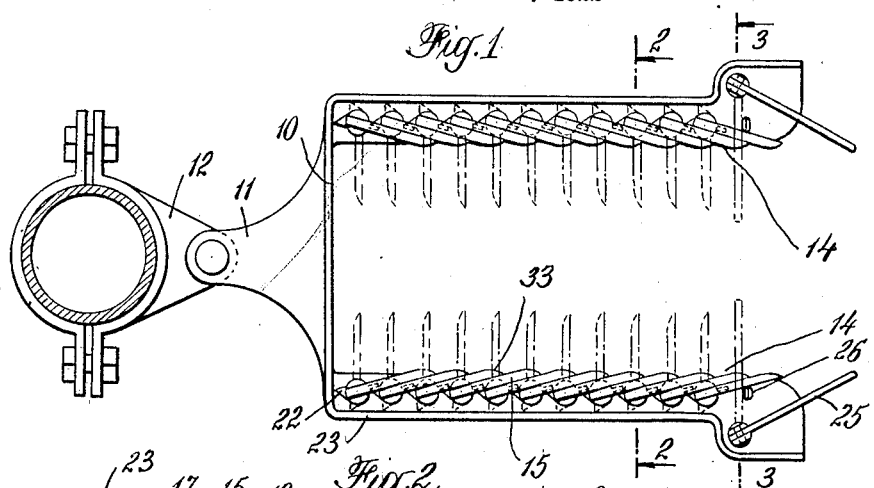
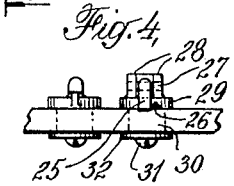
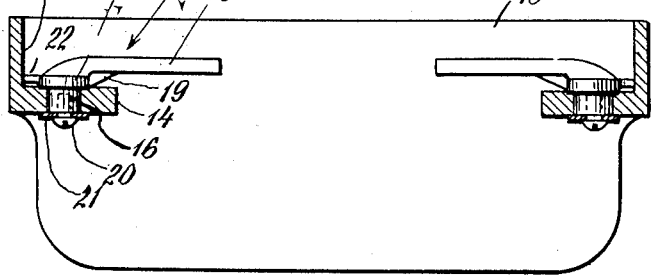
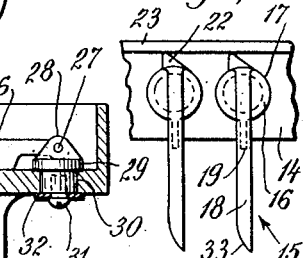
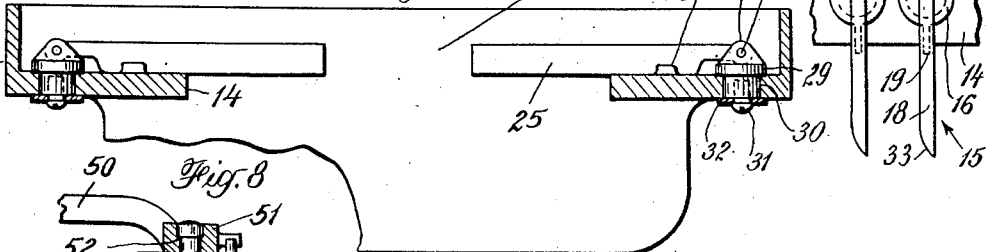
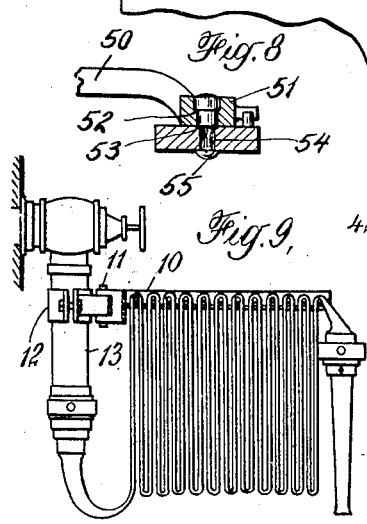
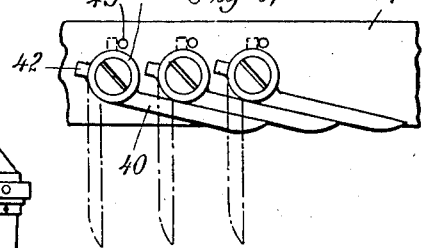
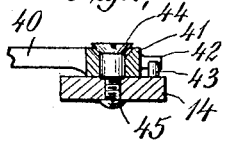
INVENTOR
William McClintock
BY
E. W. Marshall
ATTORNEY Patented Oct. 23, 1923.

1,471,500

UNITED STATES PATENT OFFICE.

WILLIAM McCLINTOCK, OF NEW YORK, N. Y.

HOSE RACK.

Application filed June 9, 1922. Serial No. 567,122.

*To all whom it may concern:*

Be it known that I, WILLIAM McCLINTOCK, a citizen of the United States, and a resident of New York, county and State of New York, have invented certain new and useful Improvements in Hose Racks, of which the following is a specification.

This invention relates to hose racks.

The invention relates more particularly to racks of the type designed for storing or holding fire hose in such a manner that one end of the hose may be attached to a water supply pipe and the other end having the nozzle is free to be grasped. The rack so supports the hose that it may be readily and quickly withdrawn for use by pulling on the nozzle end thereof.

One of the objects of the invention is to provide a hose rack having hose supporting means so constructed as to form a firm support for the hose.

Another object of the invention is to provide a hose rack that is simple but rugged in construction and may be economically manufactured.

Another object of the invention is to provide a rack of the character described in which the hose supporting arms will have a maximum useful length of supporting surface.

Further objects of the invention will appear from the following description taken in connection with the drawings which form a part of this application and in which, Fig. 1 is a top plan view of a hose rack constructed in accordance with the invention, the hose supporting arms being shown in full lines in folded position and in dotted lines in open or operative position.

Fig. 2 is a transverse sectional elevation on an enlarged scale taken substantially on line 2—2 of Fig. 1.

Fig. 3 is a similar sectional elevation taken on line 3—3 of Fig. 1.

Fig. 4 is a detail elevation showing particularly the mounting of the end arms.

Fig. 5 is a top plan view on an enlarged scale showing the hose supporting arms.

Fig. 6 is a top plan view of a portion of a rack showing another form of mounting for the supporting arms.

Fig. 7 is a sectional elevation taken through one of the arms shown in Fig. 6, and Fig. 8 is a sectional elevation of another form of the invention, and Fig. 9 is an elevational view, partly in section, showing the manner of mounting the hose rack.

Briefly described the invention consists of a hose rack having a pair of spaced supporting members or shelves and a plurality of hose supporting arms pivoted on said shelves and disposed oppositely with respect to each other. Each of the arms has an enlarged bearing portion or boss and the hose supporting parts of the arms are offset vertically with respect to the bosses whereby each arm in its folded position may overlap the boss of the next succeeding or adjacent arm. By means of this construction the arms may be made longer without increasing the distance between the supporting members or between the two sets of arms mounted thereon. The end arms at the end of the rack are preferably made longer than the other arms and these arms are preferably locked by impositive locking means against accidental opening. Each of the hose supporting arms preferably has formed thereon a lug which projects laterally from the bearing portion or boss and is adapted to engage a projecting portion or a projection on the supporting member or shelf on which the arm is mounted for the purpose of limiting the swinging movement of the arms to open or operative position. Further details of the construction will be clear from the following description.

The hose rack illustrated comprises a U-shaped frame 10 having a portion 11 pivotally supported on the clamp 12 which as shown in Fig. 9 is preferably secured to a water supply pipe 13. The frame 10 has a pair of spaced supporting members or shelves 14 on each of which is mounted a set of hose supporting arms 15, the arms of the oppositely disposed sets being alined when in their operative positions. In the embodiment of the invention shown in Figs. 1-5 inclusive, each arm has an enlarged bearing portion or boss 16 pivotally mounted in one of the supporting members or shelves 14 and also has a further enlarged portion or head 17 adapted to seat on the upper surface of the shelf 14. As clearly illustrated in Fig. 2 the hose supporting portion 18 of the arm is vertically offset from the boss or head 17 whereby each arm may overlap the head of the next adjacent arm when the arms are in their inoperative positions as shown in Fig. 1. A reinforcing web 19 is preferably formed between each of the hose supporting portions 18 of the arm and the boss or head 17 in order to strengthen the arm and form a rugged supporting member. In the form of the invention shown in Figs. 1-5 the bearing portions or bosses are secured to the supporting members by screws 20 and washers 21 are interposed between the screws and the lower or under surface of the supporting means. Each of the arms is provided with means for limiting its swinging movement to open or operative position, this means consisting of a lug 22 extending laterally from the head 17 of the boss and the lugs are adapted to engage upwardly extending flanges 23 formed on the shelves or supporting members 14.

In order to firmly retain the hose against accidental removal the arms 25 at the open end of the frame 10 are preferably made longer than the other supporting arms and are provided with impositive stops consisting of lugs 26 formed on or secured to the upper surface of the shelves 14. The arms 25 are pivotally mounted on horizontal pivots 27 carried by lugs 28 formed on heads 29 of the bearing bosses 30 and the bosses 30 are pivotally mounted in the shelves in the same manner as the bosses 16 of the supporting arms 15. It will thus be seen that the arms 25 are mounted for vertical and horizontal swinging movement and because of the vertical movement these arms may swing over the lugs 26 when they are moved to operative position. Screws 31 and washers 32 coact with the bearing bosses 30 in retaining the arms 25 on the shelves. It should be noted that the arms 15 as clearly shown in Fig. 1, are rounded as shown at 33 at their free ends and that these rounded ends extend inwardly beyond the inner edges of the shelves 14. These ends therefore form a guide for the hose as it is being inserted in the rack and obviate the necessity of extending the shelves inwardly for this purpose. Because of this construction there is a substantial saving of material.

In Figs. 6 and 7 a slightly different form of the invention is shown and in this form the arms 40 are offset laterally from the pivot bosses 41. In this embodiment also the lugs 42 carried by the pivot bosses engage projections 43 formed on or secured to the upper surfaces of the shelf 14 and thereby limit the swinging movement of the arms to operative position. The bosses are retained on the shelf by means of screws 44 which if desired may be headed over as shown at 45 on the under surface of the shelf 14. The bosses 41 are provided with countersunk openings to receive the screws.

In Fig. 8 the arm 50 extends laterally from one side of the boss 51 and is vertically offset. The boss has an opening therethrough having an annular shoulder 52 upon which seats a shoulder on the rivet 54 which extends through the boss and is headed over as shown at 55. The rivet has another shoulder 53 seating on the upper surface of the shelf 16.

From the foregoing specification it will be seen that a simple, practical and rugged hose rack has been provided and that by reason of the particular details of construction described, the supporting arms will have a maximum hose supporting surface, for the dimensions of the rack. This function is obtained by reason of the offset construction of the arms whereby they may overlap in the manner described. The end arms, moreover, by reason of the impositive lock effectively retain the hose against accidental displacement or removal.

Although certain specific embodiments of the invention have been illustrated and described it will be understood that the invention is capable of further modification and that further changes in the construction and in the arrangement of the various cooperating parts may be made without departing from the spirit or scope of the invention as expressed in the following claim.

What I claim is:—

In a hose rack, a supporting member and hose carrying arms having bosses pivoted on said member, each arm being offset vertically from its boss whereby each arm can overlap the boss of the next adjacent arm when the arms are in inoperative position.

In witness whereof, I have hereunto set my hand this 6th day of June, 1922.

WILLIAM McCLINTOCK.